(12) United States Patent
Yanagida et al.

(10) Patent No.: US 7,762,748 B2
(45) Date of Patent: Jul. 27, 2010

(54) DRILL

(75) Inventors: Kazuya Yanagida, Anpachi-gun (JP);
Masayuki Mabuchi, Anpachi-gun (JP);
Hiroyuki Higashi, Anpachi-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 180 days.

(21) Appl. No.: 11/949,165

(22) Filed: Dec. 3, 2007

(65) Prior Publication Data
US 2008/0131221 A1 Jun. 5, 2008

(30) Foreign Application Priority Data
Dec. 4, 2006 (JP) .............. 2006-326960

(51) Int. Cl.
*B23B 51/02* (2006.01)

(52) U.S. Cl. ........................ 408/59; 408/230

(58) Field of Classification Search .............. 408/56, 408/57, 59, 227, 230; *B23B 51/02, 51/06*
See application file for complete search history.

(56) References Cited

U.S. PATENT DOCUMENTS 3,096,668 A * 7/1963 Maynard .................. 408/59
3,293,727 A * 12/1966 Simms .................... 407/11
3,564,947 A * 2/1971 Maier .................... 408/211
4,728,231 A * 3/1988 Kunimori et al. .......... 408/59
5,230,593 A * 7/1993 Imanaga et al. ........... 408/230

FOREIGN PATENT DOCUMENTS

| JP | 62-61411 | 4/1987 |
| JP | 63237809 A * | 10/1988 |
| JP | 63288615 A * | 11/1988 |
| JP | 09-136206 | 5/1997 |
| JP | 2003285214 | 10/2003 |
| JP | 2005001082 | 1/2005 |
| SU | 1276446 | 12/1986 |
| WO | WO 0067939 A1 * | 11/2000 |

* cited by examiner

*Primary Examiner*—Daniel W Howell
(74) *Attorney, Agent, or Firm*—Leason Ellis LLP.

(57) ABSTRACT

A plurality of cutting oil feed holes extend from the proximal side towards the distal side are provided in a drill body located on a reference line that extends towards a circumferential central portion of an outer circumferential surface of the drill body split by a chip discharge groove from an axis in a cross section orthogonal to the axis. A cutting oil feed hole that is located on the radial outermost side is used as a first cutting oil feed hole, and a cutting oil feed hole that is on the radial innermost side is used as a second cutting oil feed hole. Two or more openings of the cutting oil feed holes are provided in one cutting edge as the plurality of cutting oil feed holes are formed in the vicinity of the intersection ridgeline portion between the distal flank face and the second thinned face.

6 Claims, 4 Drawing Sheets

DRILL

CROSS REFERENCE TO RELATED APPLICATION

The present application claims priority under 35 U.S.C. §119 to Japanese Patent Application No. 2006-326960 filed Dec. 4, 2006. The contents of this application is incorporated herein by reference in its entirety.

FIELD OF THE INVENTION

The present invention relates to a drill used for the drilling that forms a machined hole in a workpiece, and particularly, to a drill suitable for forming a machined hole in a workpiece made of ductile materials, such as aluminum.

DESCRIPTION OF THE RELATED ART

Conventionally, as the afore-mentioned drill, a so-called two-edge drill in which a cutting tip is formed on the distal side of a drill body that rotates around an axis, a pair of chip discharge grooves that extend towards the proximal side is formed at a periphery of the cutting tip, and cutting edges are formed at intersection ridgeline portions between the wall faces of the chip discharge grooves that are directed forward in the drill rotation direction, and a distal flank face of the cutting tip is known.

Generally, in the drill body in such a two-edge drill, as shown in, for example, Japanese Utility Model Application JP-U-62-61411 and Japanese Patent Application JP-A-9-136206 a pair of cutting oil feed holes are bored from the proximal face of the drill body towards the distal end thereof, and the pair of feed holes are open in the vicinity of distal flank faces of the cutting tip. That is, the cutting oil feed holes are open in the vicinity of the distal flank faces such that one cutting edge has one opening.

When adhesion of the chips to a cutting edge in such a drill is prevented, in order to increase the amount of supply of cutting oil, it is necessary to increase the cross-sectional area of the feed holes and the opening area of the openings. However, when the cross-sectional area of the feed holes is increased, the portion of the drill body to be cut away is increased. As a result, there is a possibility that the rigidity of the drill body may deteriorate, and vibration or loss may be caused during drilling. In particular, when the openings of the feed holes are largely open in the vicinity of the distal flank faces, the strength or rigidity of the cutting edge may deteriorate, and there is a possibility that the loss of the cutting edge may be caused.

Thus, a drill in which feed holes that have at least two or more openings for one cutting edge are provided is suggested in Japanese Patent Application JP-A-2005-1082. The drill having this configuration defines a rib-like reinforcing portion between two or more openings, thereby preventing deterioration of the strength or rigidity of the drill body and the cutting edge when the opening area of the openings is increased.

However, in the drill described in Japanese Patent Application JP-A-2005-1082, when the positions of the feed holes in a cross section orthogonal to an axis are not pinpointed, but some feed holes are provided in a portion close to a chip discharge groove or are provided in the vicinity of the axis of the drill body, even if the rib-like reinforcing portion is formed by forming two or more feed hole openings in one cutting edge, the rigidity of the drill body may deteriorate significantly, and vibration may be caused during drilling. As a result, there is a possibility that accurate machining cannot be performed, and the breakage of the drill body or the loss of the cutting edge may be caused by cutting resistance.

SUMMARY OF THE INVENTION

The invention has been made in view of such circumstances. It is therefore an object of the invention to provide a drill capable of increasing the amount of supply of cutting oil to cutting edges and machined holes, thereby performing cutting well, without reducing the strength or rigidity of a drill body and the cutting edges.

In order to solve the above problems, the invention provides a drill in which a chip discharge groove that extends towards the proximal side is formed at the periphery of a cutting tip provided on the distal side of a drill body that rotates around an axis, a cutting edge is formed at an intersection ridgeline portion between a wall face of the chip discharge groove that is directed forward in a drill rotation direction, and a distal flank face of the cutting tip, and a thinned portion having a first thinned face that is connected to an inner circumferential end of the cutting edge, and a second thinned face that is connected to the rear side of the distal flank face in the drill rotation direction is formed on the distal side of the cutting tip. Here, a plurality of cutting oil feed holes that extend from the proximal side towards the distal side are provided in the drill body so as to be located on a reference line that extends towards a circumferential central portion of an outer circumferential surface of the drill body split by the chip discharge groove from the axis in a cross section orthogonal to the axis. A cutting oil feed hole that is located on the radial outermost side is used as a first cutting oil feed hole, and a cutting oil feed hole that is on the radial innermost side is used as a second cutting oil feed hole. Two or more openings of the cutting oil feed holes are provided in one cutting edge as the plurality of cutting oil feed holes are formed in the vicinity of the intersection ridgeline portion between the distal flank face and the second thinned face.

In the drill having this configuration, a plurality of cutting oil feed holes are provided in the drill body so as to be located on a reference line that extends towards a circumferential central portion of an outer circumferential surface of the drill body split by the chip discharge groove from the axis in a cross section orthogonal to the axis, and two or more openings of the cutting oil feed holes are provided in one cutting edge as the cutting oil feed holes are formed in the vicinity of the intersection ridgeline portion between the distal flank face and the second thinned face. Thus, the first and second cutting oil feed holes and the openings are arranged in the places apart from the chip discharge groove. As a result, the rigidity or strength of the drill body and the cutting edge can be secured.

Therefore, the vibration during drilling is suppressed so that accurate machining can be performed, and the breakage of the drill body or the loss of the cutting edge caused by cutting resistance can be prevented.

Further, in a case where a workpiece is easy to be fused to a cutting edge portion like a case where a workpiece made of ductile materials, such as aluminum, is drilled, at least two or more openings provided in one cutting edge can be arranged so that cutting oil may be discharged in a pinpointing manner to the cutting edge portion that is apt to be fused.

Moreover, since the openings are formed in the vicinity of the intersection ridgeline portion between the distal flank face and the second thinned face, cutting oil is easy to flow backward in the drill rotation direction, and cutting oil can be efficiently supplied to the cutting edge that is located on the rear side in the drill rotation direction.

Further, since the twist of the second cutting oil feed hole located on the radial inside of the drill body becomes small, cutting oil is easy to be supplied to near the center of the drill, and the cutting oil is surely supplied to a workpiece, so that cutting can be performed well.

Here, the ratio F/R of an angle F that is formed between the reference line, and a straight line that passes through the axis and a front end of an outer circumferential surface of the drill body in the drill rotation direction that is split by the chip discharge groove, and an angle R that is formed between the reference line, and a straight line that passes through the axis and a rear end of the outer circumferential surface of the drill body in the drill rotation direction, may be set to be within a range of $0.8 \leq F/R \leq 1.3$.

In this case, since the reference line on which a plurality of cutting oil feed holes are located are surely located in a circumferential central portion between the chip discharge grooves, the spacing between the cutting oil feed holes and the chip discharge grooves can be secured, and deterioration of the strength or rigidity of the drill body can be prevented surely.

Further, the distance r1 from the axis to the center of the first cutting oil feed hole may be set to be within a range of $0.295 \times D \leq r1 \leq 0.35 \times D$ with respect to the external diameter D of the drill body.

In this case, the spacing between the outer circumferential surface of the drill body, and the first cutting oil feed hole can be secured, deterioration of the strength or rigidity of the drill body can be surely prevented, and the space where the second cutting oil feed hole is provided on the radial inside of the drill body can be secured.

Further, the distance r2 from the axis to the center of the second cutting oil feed hole may be set to be within a range of $0.125 \times D \leq r2 \leq 0.175 \times D$ with respect to the external diameter D of the drill body.

In this case, the spacing between the second cutting oil feed hole and the axis can be secured, and the spacing from the first cutting oil feed hole that is located radially outside can be secured. As a result, deterioration of the strength or rigidity of the drill body can be prevented surely.

Moreover, the core thickness C of the drill body may be set to be within a range of $0.2 \times D \leq C \leq 0.35 \times D$, and the second cutting oil feed hole may be placed on the outside of the groove bottom of the chip discharge groove, towards the outer corner.

In this case, the diameter of a circle C around the axis defined by connecting the groove bottoms of the chip discharge grooves, i.e., the core thickness C is set to be within a range of $C \geq 0.2 \times D$, the rigidity of the drill body can be secured. Further, since the relationship $C \leq 0.35 \times D$ is satisfied and the second cutting oil feed hole is placed on the outside of the groove bottom of the chip discharge groove, towards the outer corner, the spacing between the second cutting oil feed hole and the groove bottom of the chip discharge groove can be secured, and deterioration of the strength or rigidity of the drill body can be prevented surely.

Further, the internal diameter d1 of the first cutting oil feed hole may be set to be within a range of $0.09 \times D \leq d1 \leq 0.14 \times D$ with respect to the external diameter D of the drill body, and the internal diameter d2 of the second cutting oil feed hole may be set to be within a range of $0.04 \times D \leq d2 \leq 0.08 \times D$.

In this case, since the relationships $d1 \geq 0.09 \times D$ and $d2 \geq 0.04 \times D$ are satisfied, it is possible to surely discharge cutting oil through the first and second cutting oil feed holes. Further, since the relationships $d1 \leq 0.14 \times D$ and $d2 \leq 0.08 \times D$ are satisfied, the portion of the drill body to be cut away can be reduced, and deterioration of the strength or rigidity of the drill body can be prevented surely.

According to the invention, it is possible to provide a drill capable of increasing the amount of supply of cutting oil to cutting edges and machined holes, thereby performing cutting well, without reducing the strength or rigidity of a drill body and the cutting edges.

DETAILED DESCRIPTION OF THE INVENTION

Figure 1:
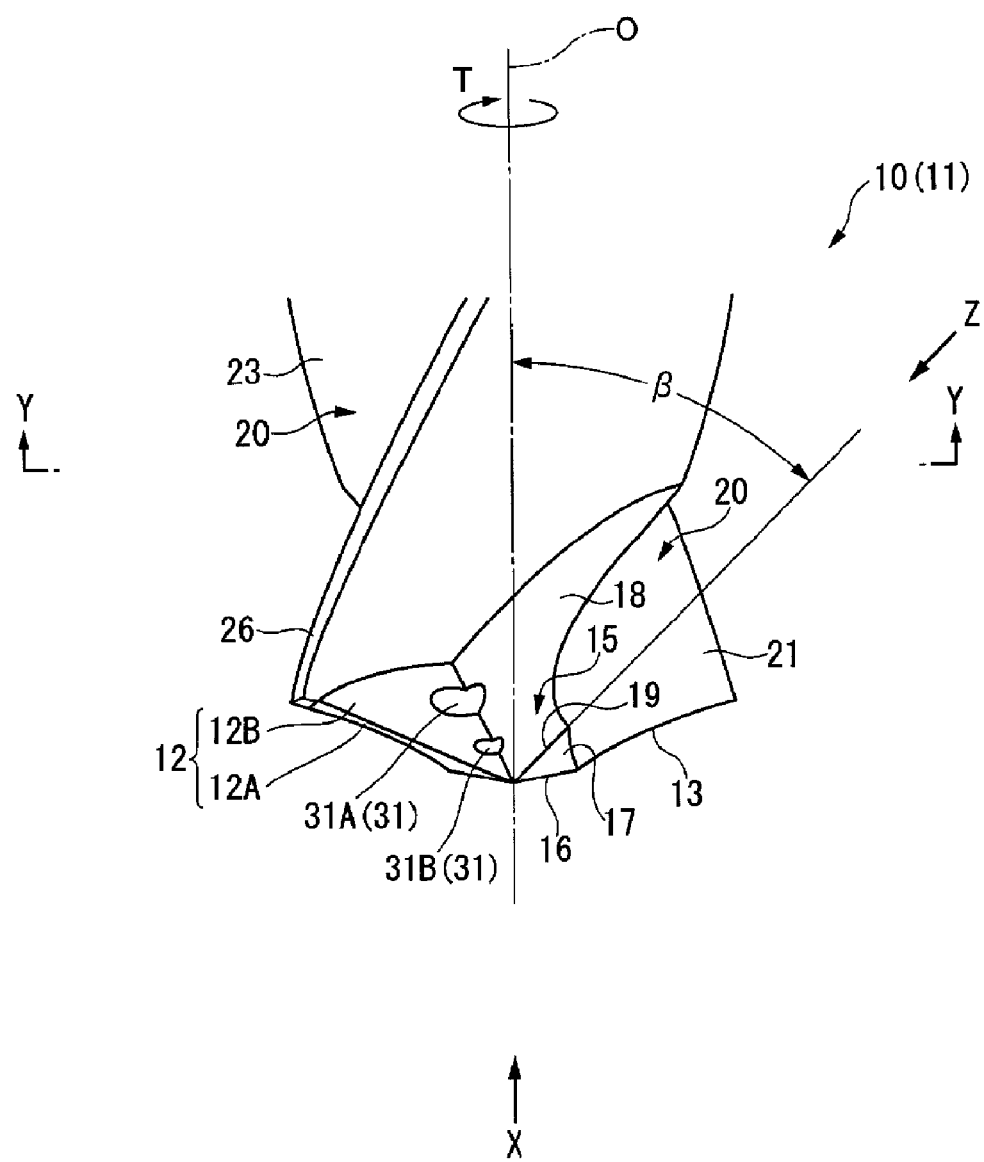
FIG. 1 is a side view of a drill that is an embodiment of the invention.
Figure 2:
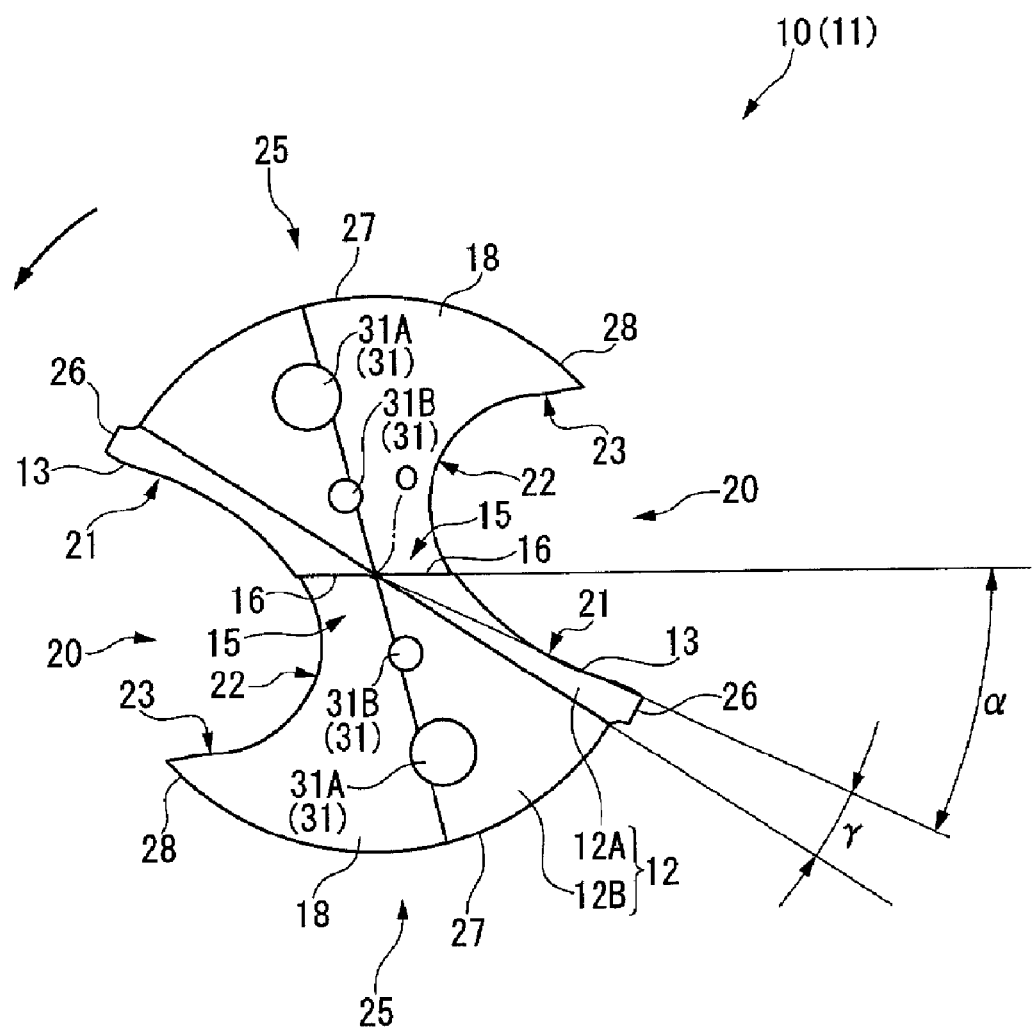
FIG. 2 is a view as seen from the direction X in FIG. 1.

A drill that is an embodiment of the invention will be described with reference to the accompanying drawings. A drill that is an embodiment of the invention is shown in FIGS. 1 to 3.

The drill that is the present embodiment is used when a workpiece made of aluminum is drilled. A drill body 10 of the drill is made of a hard material, such as cemented carbide. As shown in FIG. 1, the drill body is formed substantially in the shape of a cylinder around the axis O. A proximal (upside in FIG. 1) portion of the drill body 10 is used as a shank gripped by a spindle of a machine tool, etc., and a distal (downside in FIG. 1) portion of the drill body 10 is used as a cutting tip 11.

A pair of chip discharge grooves 20 and 20 that are twisted backward in a drill rotation direction T at a fixed angle of twist as they go to the proximal side in the direction of an axis O from a distal flank face 12 are formed in the symmetry of rotation of 180° with respect to the axis O at a periphery of the cutting tip 11. This chip discharge groove 20 has a wall face 21 that is directed forward in the drill rotation direction T, a groove bottom 22 that is directed radially outward of the drill body 10, and a wall face 23 that is directed backward in the drill rotation direction T.

Figure 3:
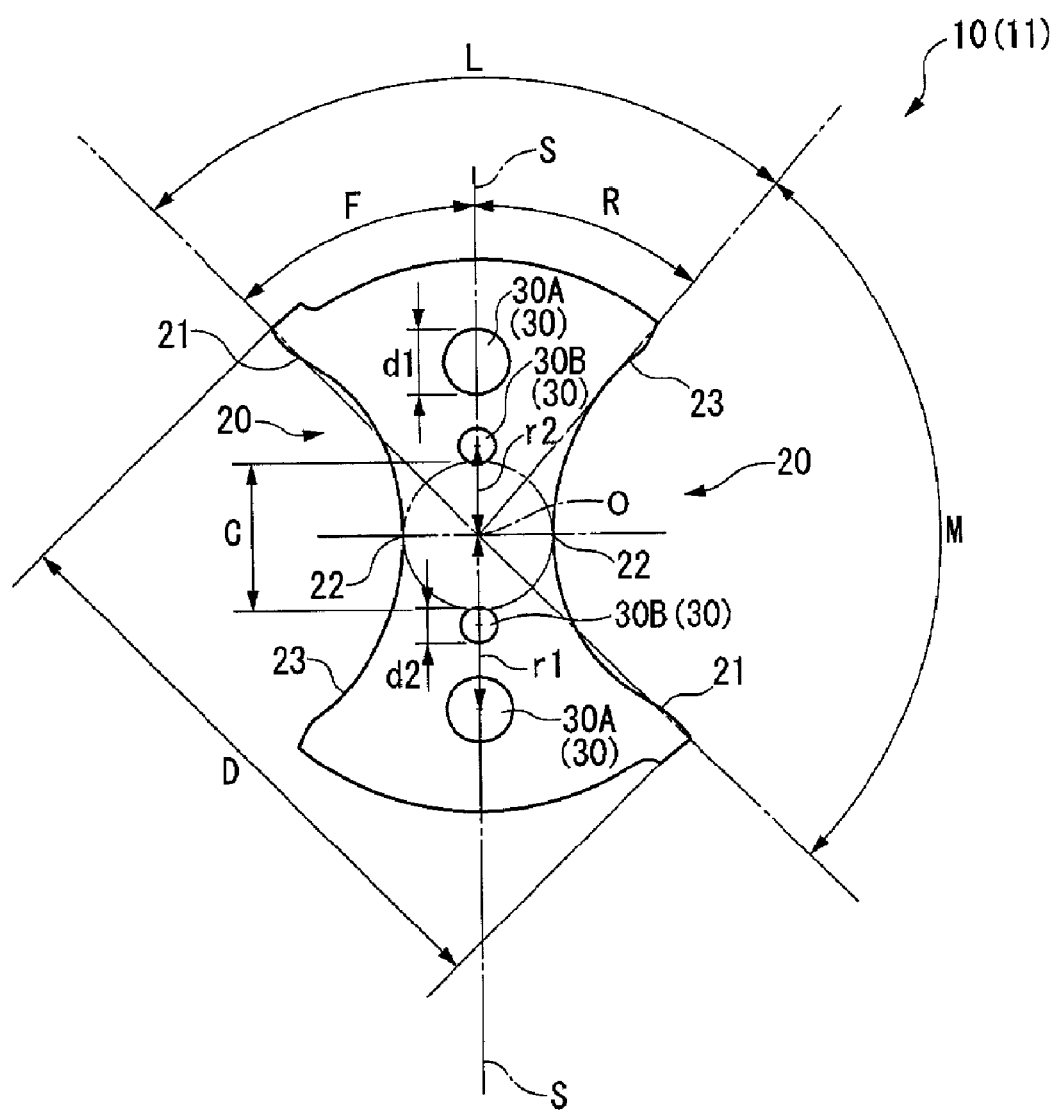
FIG. 3 is a sectional view taken along the line Y-Y of FIG. 1.

In the chip discharge groove 20, as shown in FIG. 3 that is a cross section orthogonal to the axis O, the circumferential width M around the axis O is made approximately equal to the circumferential width L of the drill body 10 other than the chip discharge groove 20, and M/L is set to be within a range of $0.9 \leq M/L \leq 1.2$.

Further, cutting edges 13 and 13 are formed at intersection ridgeline portions between the wall faces 21 and 21 of the chip discharge grooves 20 and 20 that are directed forward in the drill rotation direction T, and the distal flank face 12, respectively.

Here, the distal portion of the wall face 21 of the chip discharge groove 20 that is directed forward in the drill rotation direction T is constituted with a convex surface that is recessed backward in the drill rotation direction T, and a convex surface that is connected to the outer circumferential end of the concave surface, and is bulged forward in the drill rotation direction T. Thereby, the cutting edge 13 formed at the intersection ridgeline portion between the wall face 21 that is directed forward in the drill rotation direction T, and the distal flank face 12, is formed in the shape of a concave curve that is recessed backward in the drill rotation direction T, and is formed in the shape of a convex curve that is bulged forward in the drill rotation direction T, at the outer circumferential end. That is, the cutting edge 13 will assume an S shape that is smoothly curved as seen from the distal side in the direction of the axis O.

Further, as shown in FIG. 2, the distal flank face 12 of the cutting tip 11 is formed in the shape of a multi-stage faces that are constituted with first flank faces 12A and 12A where the cutting edges 13 and 13 are formed at ridgeline portions on the front side in the drill rotation direction T as the chip discharge grooves 20 and 20 intersect each other, and second flank faces 12B and 12B that are connected to the rear side of the first flank faces 12A and 12A in the drill rotation direction T. As a result, the relief that increases in a multi-stage manner as it goes backward in the drill rotation direction T is given to the cutting edges 13 and 13. In addition, in the present embodiment, the angle of relief that is formed by the first flank face 12A is set to be within a range of 5° to 15°, and the angle of relief that is formed by the second flank face 12B is set to be within a range of 20° to 30°.

Moreover, the distal flank face 12 is inclined so as to gradually approach the proximal side of the cutting tip 1 as it goes radially outward of the drill body 10, and so as to give a predetermined tip angle to the cutting edges 13 and 13.

Further, the tip portion of the cutting tip 11 is formed with a thinned portion 15 that is connected to the inner circumferential end of the cutting edge 13 and reaches a land 25 by cutting away an intersection ridgeline portion between the groove bottom 22 of the chip discharge groove 20, the wall face 23 that is directed backward in the drill rotation direction T, and the distal flank face 12 (the first flank face 12A and the second flank face 12B), inward of the chip discharge groove 20 as it intersects the axis O, and approaches the proximal side of the cutting tip 11.

Accordingly, the inner circumferential end of the cutting edge 13 is used as a thinned cutting edge 16 that is formed at an intersection ridgeline portion between the thinned portion 15 and the first flank face 12A, and extends in the shape of a straight line towards the axis O. As seen from the distal side of the drill body 10, the intersection angle $\alpha$ around the axis O that is formed by the outer circumferential ends of the thinned cutting edge 16 and the cutting edge 13 is set to be within a range of $20°\leq\alpha\leq30°$.

In the thinned portion 15, the portion that intersects the groove bottom 22 of the chip discharge groove 20, and is connected to the thinned cutting edge 16 is used as a first thinned face 17 shaped planer that extends along the direction of the axis O forward in the drill rotation direction T.

Further, in the thinned portion 15, the portion that intersects the wall face 23 that is directed backward in the drill rotation direction T in the chip discharge groove 20 and is connected to the second flank face 12B is used as a second planar thinned face 18 that extends so as to reach the land 25 backward in the drill rotation direction T, and that is inclined so as to approach the rear side in the direction of the axis O as it goes backward in the drill rotation direction T.

Figure 4:
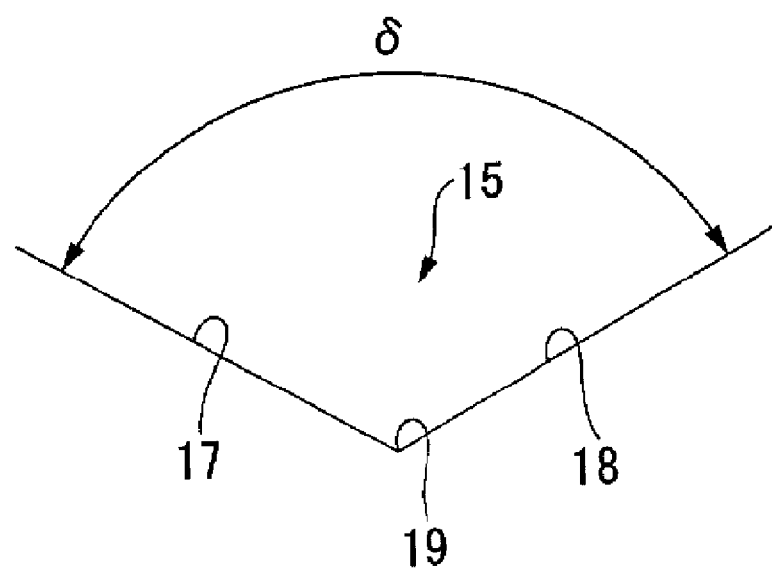
FIG. 4 is a view as seen from the direction Z in FIG. 1.

The thinned portion 15 forms a valley shape by allowing the first thinned face 17 and the second thinned face 18 that constitute the thinned portion to intersect each other an obtuse angle. An intersection portion between the first thinned face 17 and the second thinned face 18 is used as a valley bottom 19 that extends towards the inner circumferential end (the inner circumferential end of the thinned cutting edge 16) of the cutting edge 13 from the groove bottom 22 of the chip discharge groove 20, i.e., towards the axis O located at the center of the distal flank face 12, and that is inclined so as to approach the distal side in the direction of axis O as it goes radially inward of the drill body. Here, the angle $\beta$ that is formed by the axis O and the valley bottom 19 is set to be within a range of $40°\leq\beta\leq50°$. Moreover, the angle of intersection between the first thinned face 17 and the second thinned face 18, which is shown in FIG. 4, i.e., the opening angle $\delta$ of the thinned portion 15 is set to be within a range of $115°\leq\delta\leq125°$.

Further, an intersection ridgeline portion between the second thinned face 18 and the second flank face 12B is arranged so as to extend towards a circumferential central portion of the land 25.

The outer circumferential surface excluding the pair of chip discharge grooves 20 and 20 in the cutting tip 11, i.e., the land 25 in the drill, as shown in FIG. 2 that is a cross section orthogonal to the axis O, is constituted with a margin portion 26 that intersects an outer circumferential ridgeline portion of the wall face 21 that is directed forward in the drill rotation direction T of the chip discharge groove 20, and forms a substantially circular-arc shape around the axis O, and a relieving face 27 that is connected to the rear side of the margin portion 26 in the drill rotation direction T, and forms a substantially circular-arc shape around the axis O having an external diameter that is one-step smaller than a circular arc that is formed by the margin portion 26. The rear end of the relieving face 27 in the drill rotation direction T i.e., the outer circumferential end of the wall face of the chip discharge groove 20 that is directed backward in the drill rotation direction T is used as a heel portion 28.

Further, similarly to the chip discharge groove 20, the margin portion 26 and the relieving face 27 are formed so as to be twisted backward in the drill rotation direction T as it approaches the rear side in the direction of the axis O from the portion that intersects the distal flank face 12.

In addition, in the present embodiment, the angle $\gamma$ that is formed by a straight line that connects the axis O and the front end of the margin portion 26 in the drill rotation direction T, and a straight line that connects the axis O and the rear end of the margin portion 26 in the drill rotation direction T is set to be within a range of $5°\leq\gamma\leq15°$.

Also, a plurality of cutting oil feed holes 30 that extend from the proximal side to the distal side in the direction of the axis O and form a substantially circular shape in a cross section orthogonal to the axis O are formed at the drill body 10 such that they avoid the chip discharge grooves 20 and 20 and form a spiral shape adapted to the twist of the chip discharge grooves 20 and 20. Such cutting oil feed holes 30 can be formed, for example, by performing extrusion pressing using a mould on a compact before sintering of the drill body 10 made from cemented carbide.

The plurality of cutting oil feed holes 30 are arranged on a reference line S that the center of a circle formed in a cross section orthogonal to the axis O extends towards the circumferential central portion of the outer circumferential surface of the drill body 10 from the axis O similarly in the cross section orthogonal to the axis O. In the present embodiment, a pair of first cutting oil feed holes 30A and 30A located on the radial outside of the drill body and a pair of second cutting oil feed holes 30B and 30B located on the radial inside of the drill body are provided, and consequently, four cutting oil feed holes 30 are bored in the whole drill body 10. Further, the pair of first cutting oil feed holes 30A and 30A and the pair of second cutting oil feed holes 30B and 30B are arranged in the symmetry of rotation of 180 degrees around the axis O.

Here, the ratio F/R of an angle F that is formed between the reference line S, and a straight line that passes through the axis O and the front end (front end of the margin portion 26 in the drill rotation direction T) of the outer circumferential surface (land 25) of the drill body 10 in the drill rotation direction T that is split by the chip discharge groove 20, and an angle R that is formed between the reference line S, and a straight line that passes through the axis O and the rear end (rear end of the relieving face 27 in the drill rotation direction T) of the outer circumferential surface (land 25) of the drill body 10 in the drill rotation direction T is set to be within a range of $0.8 \leq F/R \leq 1.3$. In the present embodiment, the ratio F/R=1 is satisfied.

Openings 31A and 31B of the two cutting oil feed holes 30A and 30B are provided in one cutting edge 13 as the plurality of cutting oil feed holes 30 are formed in the vicinity of at an intersection ridgeline portion between the second flank face 12B of the distal flank face 12, and the second thinned face 18.

The distance r1 from the axis O to the center of the first cutting oil feed hole 30A is set to be within a range of $0.295 \times D \leq r1 \leq 0.35 \times D$.

Similarly, the distance r2 from the axis O to the center of the second cutting oil feed hole 30B is set to be within a range of $0.125 \times D \leq r2 \leq 0.175 \times D$.

Further, the diameter of a circle C around the axis O defined by connecting the groove bottoms 22 of the chip discharge grooves 20, i.e., the core thickness C of the drill body 10 is set to be within a range of $0.2 \times D \leq C \leq 0.35 \times D$, and the second cutting oil feed hole 30B is placed on the outside of the core thickness C of the drill body 10, towards the outer corner.

Moreover, the internal diameter d1 of the first cutting oil feed hole 30A is set to be within a range of $0.09 \times D \leq d1 \leq 0.14 \times D$ with respect to the external diameter D of the drill body 10, and the internal diameter d2 of the second cutting oil feed hole 30B is set to be within a range of $0.04 \times D \leq d2 \leq 0.08 \times D$.

In the drill configured as described above, the shank formed at the proximal end of the drill body 10 is gripped by a spindle of a machine tool, is rotated around the axis O, is fed towards the distal side in the direction of the axis O, and is pressed against a workpiece, thereby forming a machined hole having a predetermined internal diameter in the workpiece. During this cutting, the cutting oil supplied from a machine tool is discharged from the openings 31A and 31B through the first and second cutting oil feed holes 30A and 30B provided in the drill body 10, thereby performing lubrication or cooling of the cutting edge 13 or machined hole, and extruding and discharging the chips generated by the cutting edge 13 into the chip discharge groove 20.

In the drill having this configuration, the first and second cutting oil feed holes 30A and 30B are provided in the drill body 10 so as to be located on the reference line S that extends towards the circumferential central portion of the outer circumferential surface (land 25) of the drill body 10 split by the chip discharge groove 20 from the axis O in a cross section orthogonal to the axis O, and the two openings 31A and 31B are provided in one cutting edge 13 as the first and second cutting oil feed holes 30A and 30B are formed in the vicinity of the intersection ridgeline portion between the second flank face 12B and the second thinned face 18. Thus, the first and second cutting oil feed holes 30A and 30B and the openings 31A and 31B are arranged in the places apart from the chip discharge groove 20. As a result, the rigidity or strength of the drill body 10 and the cutting edge 13 can be secured.

Therefore, the vibration of the drill body 10 during drilling can be suppressed, and machining with excellent dimensional accuracy can be performed. Moreover, breakage of the drill body 10 or loss of the cutting edge 13 caused by cutting resistance can be prevented, and the lifespan of the drill can be prolonged.

Further, since the two openings 31A and 31B are provided in one cutting edge 13, fusion can be prevented by arranging the openings 31A and 31B so that the cutting oil can be discharged in a pinpointing manner to a portion where fusion of the cutting edge 13 is apt to be caused.

Moreover, since the openings 31A and 31B are formed in the vicinity of the intersection ridgeline portion between the second flank face 12B and the second thinned face 18, cutting oil is easy to flow backward in the drill rotation direction T, and cutting oil can be efficiently supplied to the cutting edge 13 that is located on the rear side in the drill rotation direction T.

Further, since the twist of the second cutting oil feed hole 30B located on the radial inside of the drill body 10 becomes small, cutting oil is easy to be supplied to near the center of the drill, and the cutting oil is surely supplied to a workpiece, so that cutting can be performed well.

In the present embodiment, the ratio F/R of an angle F that is formed between the reference line S, and a straight line that passes through the axis O and the front end (front end of the margin portion 26 in the drill rotation direction T) of the outer circumferential surface (land 25) of the drill body 10 in the drill rotation direction T that is split by the chip discharge groove 20, and an angle R that is formed between the reference line S, and a straight line that passes through the axis O and the rear end (rear end of the relieving face 27 in the drill rotation direction T) of the outer circumferential surface (land 25) of the drill body 10 in the drill rotation direction T is set to be within a range of $0.8 \leq F/R \leq 1.3$. Thus, the circumferential spacing between the first and second cutting oil feed holes 30A and 30B and the chip discharge groove 20 can be secured, and deterioration of the strength or rigidity of the drill body 10 can be prevented surely.

Further, since the distance r1 from the axis O to the center of the first cutting oil feed hole 30A is set to be within a range of $0.295 \times D \leq r1 \leq 0.35 \times D$ with respect to the external diameter D of a drill body, the spacing between the outer circumferential surface of the drill body 10, and the first cutting oil feed hole 30A can be secured, deterioration of the strength or rigidity of the drill body 10 can be surely prevented, and the space where the second cutting oil feed hole 30B is provided on the radial inside of the drill body 10 can be secured.

Moreover, since the distance r2 from the axis O to the center of the second cutting oil feed hole 30B is set to be within a range of $0.125 \times D \leq r2 \leq 0.175 \times D$, the spacing between the second cutting oil feed hole 30B and the axis O can be secured, and the spacing from the first cutting oil feed hole 30A that is located radially outside can be secured. As a result, deterioration of the strength or rigidity of the drill body 10 can be prevented surely.

Further, since the core thickness C of the drill body 10 is set to be within a range of $0.2 \times D \leq C \leq 0.35 \times D$, and the second cutting oil feed hole 30B is placed on the outside of the core thickness C of the drill body 10, towards the outer corner, the spacing between the second cutting oil feed hole 30B and the groove bottom 22 of the chip discharge groove 20 becomes large, and the strength and the rigidity of the drill body 10 can be secured.

Moreover, since the internal diameter d1 of the first cutting oil feed hole 30A is set to be within a range of $0.09 \times D \leq d1 \leq 0.14 \times D$, and the internal diameter d2 of the second cutting oil feed hole 30B is set to be within a range of $0.04 \times D \leq d2 \leq 0.08 \times D$, it is possible to surely discharge cutting oil through the first and second cutting oil feed holes 30A and 30B. As a result, cutting can be performed well. Further, since the relationships $d1 \leq 0.14 \times D$ and $d2 \leq 0.08 \times D$ are satisfied, the portion of the drill body 10 to be cut away can be prevented from increasing more than necessary.

In addition, in the present embodiment, the cutting edge 13 assumes an S shape that is smoothly curved as seen from the distal side in the direction of the axis O, and the relief angle of the first flank face 12A that is connected to the cutting edge 13 is set to be within a range of 5° to 15°, and the relief angle of the second flank face 12B is set to be within a range of 20° to 30°. Thus, the sharpness of the cutting edge 13 can be improved, and a workpiece can be drilled efficiently.

Further, since the angle γ that is formed by a straight line that connects the axis O and the front end of the margin portion 26 in the drill rotation direction T and a straight line that connects the axis O and the rear end of the margin portion 26 in the drill rotation direction T is set to be within a range of 5°≦γ≦15°, the vibration of the axis O of the drill body 10 caused by sliding of the margin portion 26 on the inner circumferential surface of a machined hole can be prevented, and a cutting force can prevented from becoming large more than necessary.

Moreover, since the intersection angle α around the axis O that is formed by the outer circumferential ends of the thinned cutting edge 16 and the cutting edge 13 as seen from the distal side of the drill body 10 is set to be within a range of 20°≦α≦30°, the angle β that is formed by the axis O and the valley bottom 19 that is an intersection portion between the first thinned face 17 and the second thinned face 18 is set to be within a range of 40°≦β≦50°, and the opening angle δ of the thinned portion 15 is set to be within a range of 115°≦δ≦125°, the biting performance of the drill can improve, and accurate drilling can be performed.

Although the drill that is the embodiment of the invention has been described hitherto, the invention is not limited thereto, and can be suitably changed departing from the technical idea thereof.

For example, it is preferable that the shape of a cutting tip, such as a tip angle, the shape of a cutting edge, and the relief angle of a flank face, and the width of a margin portion, is not limited to the present embodiment, and is suitably set in consideration of the material, cutting conditions, etc. of a workpiece.

Further, although the above description has been made about making the drill body of cemented carbide, the invention is not limited thereto. For example, the drill body may be made of other materials, such as a high-speed steel material. Moreover, hard films, such as TiN, TiCN, and TiAlN, may be covered on the surface of a cutting tip.

Further, although the above description has been made about a so-called two-edge drill having a pair of chip discharge grooves and having cutting edges formed at the tips of the chip discharge grooves, the invention is not be limited thereto. For example, a drill of one edge or three or more edges may be used.

Moreover, although the above description has been made about providing four cutting oil feed holes, the invention is not limited thereto. For example, when the external diameter of a drill is large, the number of cutting oil feed holes may be further increased.

What is claimed is:

1. A drill comprising:
a chip discharge groove that extends towards a proximal side of the drill body is formed at the periphery of a cutting tip provided on a distal side of the drill body that rotates around an axis;
a cutting edge formed at an intersection ridgeline portion between a wall face of the chip discharge groove that is directed forward in a drill rotation direction, and a distal flank face of the cutting tip;
a thinned portion having:
a first thinned face that is connected to an inner circumferential end of the cutting edge; and
a second thinned face that is connected to a rear side of the distal flank face in the drill rotation direction is formed on the distal side of the cutting tip; and
a plurality of cutting oil feed holes that extend from the proximal side towards the distal side are provided in the drill body so as to be located on a reference line that extends towards a circumferential central portion of an outer circumferential surface of the drill body split by the chip discharge groove from the axis in a cross section orthogonal to the axis,
wherein a cutting oil feed hole that is located on the radial outermost side is used as a first cutting oil feed hole, and a cutting oil feed hole that is on the radial innermost side is used as a second cutting oil feed hole,
wherein two or more openings of the cutting oil feed holes are provided for the cutting edge whereby the plurality of cutting oil feed holes are formed with centers radially displaced from and in the vicinity of an intersection ridgeline portion between the distal flank face and the second thinned face, and
wherein a ratio F/R of an angle F that is formed between the reference line, and a straight line that passes through the axis and a front end of an outer circumferential surface of the drill body in the drill rotation direction that is split by the chip discharge groove, and an angle R that is formed between the reference line, and a straight line that passes through the axis and a rear end of the outer circumferential surface of the drill body in the drill rotation direction, is set to be within a range of 0.8≦F/R≦1.3.

2. The drill according to claim 1, wherein an internal diameter d2 of the second cutting oil feed hole is set to be within a range of 0.04×D≦d2≦0.08×D with respect to an external diameter D of the drill body.

3. The drill according to claim 1, wherein a distance r1 from the axis to the center of the first cutting oil feed hole is set to be within a range of 0.295×D≦r1≦0.35×D with respect to an external diameter D of the drill body.

4. The drill according to claim 1, wherein a distance r2 from the axis to the center of the second cutting oil feed hole is set to be within a range of 0.125×D≦r2≦0.175×D with respect to an external diameter D of the drill body.

5. The drill according to claim 1, wherein a core thickness C of the drill body is set to be within a range of 0.2×D≦C≦0.35×D, and the second cutting oil feed hole is placed on the outside of the groove bottom of the chip discharge groove, towards the outer corner wherein D is an external diameter of the drill body.

6. The drill according to claim 1, wherein an internal diameter d1 of the first cutting oil feed hole is set to be within a range of 0.09×D≦d1≦0.14×D with respect to an external diameter D of the drill body.

* * * * *